(12) United States Patent
Jaye (10) Patent No.: US 12,345,652 B2
(45) Date of Patent: Jul. 1, 2025

(54) METHOD AND APPARATUS FOR INSPECTION OF A SUBJECT ARTICLE

(71) Applicant: SENS-TECH LTD., Egham (GB)

(72) Inventor: Stephen Jaye, Egham (GB)

(73) Assignee: SENS-TECH LTD., Egham (GB)

( * ) Notice: Subject to any disclaimer, the term of this patent is extended or adjusted under 35 U.S.C. 154(b) by 265 days.

(21) Appl. No.: 18/030,570

(22) PCT Filed: Sep. 2, 2021

(86) PCT No.: PCT/EP2021/074291
§ 371 (c)(1),
(2) Date: Apr. 6, 2023

(87) PCT Pub. No.: WO2022/073703
PCT Pub. Date: Apr. 14, 2022

(65) Prior Publication Data
US 2023/0375481 A1     Nov. 23, 2023

(30) Foreign Application Priority Data
Oct. 6, 2020 (EP) .................................... 20200259

(51) Int. Cl.
*G01N 21/88*     (2006.01)

(52) U.S. Cl.
CPC ... *G01N 21/88* (2013.01); *G01N 2201/06113* (2013.01)

(58) Field of Classification Search
CPC ......... G01N 21/88; G01N 2201/06113; G01N 21/9036; G01N 2021/8816
See application file for complete search history.

(56) References Cited

U.S. PATENT DOCUMENTS

| 3,835,332 A | 9/1974 | Bridges |
| 6,025,905 A | 2/2000 | Sussman |

(Continued)

FOREIGN PATENT DOCUMENTS

| EP | 1221613 A2 | 7/2002 |
| EP | 2390656 A2 | 11/2011 |

(Continued)

OTHER PUBLICATIONS

International Search Report Dated Dec. 20, 2021 In Application PCT/EP2021/074291, 3, Pages.

(Continued)

*Primary Examiner* — Kiho Kim
(74) *Attorney, Agent, or Firm* — LUCAS & MERCANTI, LLP; Klaus P. Stoffel (57) ABSTRACT

A sensing apparatus including a plurality of sensing units having an energy source for transmitting a beam of electromagnetic radiation through a subject article and a detector for receiving the beam emerging from the subject article, and a controller, in which the detectors are arranged in a dispersed configuration, in which the sensing units include multiple groups. The controller sends a first activation signal to an individual group and a second activation signal to the next group at separate times and subsequent signals to further groups. In the dispersed configuration each detector of each group is spaced from each other detector of each other group a greater distance than it is spaced from the nearest detector of the next sequential group.

17 Claims, 6 Drawing Sheets

(56) References Cited

U.S. PATENT DOCUMENTS

| | | |
|---|---|---|
| 2003/0146394 A1* | 8/2003 | Prange ............... G01N 21/6486 |
| | | 250/459.1 |
| 2009/0279773 A1 | 11/2009 | Gan |
| 2014/0354984 A1 | 12/2014 | Tung |
| 2014/0354994 A1 | 12/2014 | Ahner |
| 2018/0252691 A1 | 9/2018 | Blanc |
| 2019/0250106 A1 | 8/2019 | Fillon |
| 2019/0379881 A1 | 12/2019 | Tewes |

FOREIGN PATENT DOCUMENTS

| | | |
|---|---|---|
| GB | 2498086 A | 7/2013 |
| JP | 2013213836 A | 10/2013 |

OTHER PUBLICATIONS

European Search Report Dated Mar. 12, 2021 In Application EP 20200259, 2 Pages.

\* cited by examiner

METHOD AND APPARATUS FOR INSPECTION OF A SUBJECT ARTICLE

CROSS-REFERENCE TO RELATED APPLICATIONS

The present application is a 371 of International application PCT/EP2021/074291, filed Sep. 2, 2021, which claims priority of EP 20200259.8 filed Oct. 6, 2020, the priority of these applications is hereby claimed and the applications are incorporated herein by reference.

BACKGROUND OF THE INVENTION

The present invention relates to a method and an apparatus for use in detecting components or defects in materials such as food, ceramics, composites etc.

Sensing apparatus for investigating the internal structure of subject articles are widely known and have many different applications. One application in particular is checking for the presence of bone or cartilage in meat being processed for human consumption. It is a requirement for such meat products to be free from particles which could endanger the end consumer, and to satisfy all kinds of legal regulations. As meat for human consumption is processed on an industrial scale and at high speeds, there is a requirement for sensing apparatus which can detect the presence of bone or cartilage particles efficiently and quickly.

X-ray imaging systems have been used to investigate the internal structure and properties of a range of objects, including food products and the human body. In particular, X-ray imaging systems have in the past been used to detect the presence of bone or cartilage particles in meat being processed for human consumption. However, this approach is only effective in detecting material of a certain density. This is not an issue with raw food products such as beef or pork because the donor animal is sufficiently developed for its bone or cartilage to have reached a level of density to be detected by an X-ray imaging system. However, when it comes to meats like chicken or other poultry X-ray imaging systems are not effective because the bone and cartilage of the donor animal is usually too underdeveloped and therefore not sufficiently dense for particles to be readily detectable.

There are other issues with X-ray imaging systems, including the facts that they are potentially hazardous to operating personnel, are large in size, and are expensive.

US2009/0279773 to GAN et al. proposes the use of beams of electromagnetic radiation rather than ionizing radiation in order to investigate the internal structure of subject articles. In particular, in one version a near infra-red (NIR) laser is used. A source beam of NIR is transmitted through a subject article to a detector, which detects the portion of the source beam which reaches it, and generates a detector signal accordingly. A controller then generates a difference value corresponding to the difference between the amplitude of the detector signal and the amplitude of a reference signal which is the same as a drive signal for the source beam. The difference value can be used in any appropriate manner to detect the presence of particular materials. GAN also discloses using an array of NIR detectors either in a linear or planar configuration, so that a subject article can be inspected at a plurality of spatially separate locations at the same time. In theory such a structure can generate an image of the subject article if the detector signals are digitized and an imaging function configured to present a visual image on a display screen comprising pixels with visual characteristics generated based on the difference values.

However, it has been found that this is not in fact possible when seeking to investigate the internal structure of something like chicken meat, because the NIR source beams scatter too much as they pass through the material, and send interference to adjacent detectors. In particular, a NIR source laser beam passing through an average piece of chicken meat being processed for human consumption scatters across an area of about 40 mm or more in diameter. As such, a linear array of NIR source beams would have to be at least 40 mm apart from one another to avoid interference, which is too far to gather sufficient data. To gather enough data to generate a decipherable image of the internal structure of a subject article an array of NIR source beams need to be transmitted therethrough at intervals of about 2.5 mm.

The present invention is intended to overcome some of the above described problems.

The method for inspection of a subject article comprises:
  providing a plurality of beam trajectories for beams of electromagnetic radiation, said plurality of beam trajectories being arranged in a dispersed configuration that is decomposable into a partition of groups of beam trajectories, each of said groups including at least one beam trajectory, the distances between said beam trajectories in groups including more than one beam trajectory being not less than a predetermined value which is greater than at least one of the distances between said beam trajectories in said plurality of beam trajectories; and
  successively activating each of said groups so as to cause said beams of electromagnetic radiation to be transmitted along said beam trajectories of said group while positioning said subject article in said plurality of beam trajectories, and sensing the electromagnetic radiation from each of said beams that have been transmitted through or reflected from said subject article.

The apparatus for inspection of a subject article comprises:
  means for transmitting a plurality of beams of electromagnetic radiation along a plurality of beam trajectories, said beam trajectories being arranged in a dispersed configuration that is decomposable into a partition of groups of beam trajectories, each of said groups including at least one beam trajectory, the distances between said beam trajectories in groups including more than one beam trajectory being not less than a predetermined value which is greater than at least one of the distances between said beam trajectories in said plurality of beam trajectories;
  means for positioning said subject article in said plurality of beam trajectories; and
  means for sensing the electromagnetic radiation of each of said beams that has been transmitted through or reflected from said subject article.

Therefore, according to the present invention a sensing apparatus may comprise a plurality of sensing units corresponding to a plurality of beam trajectories and comprising an energy source for transmitting a beam of electromagnetic radiation along each of said beam trajectories onto a subject article and a detector for receiving a portion of said beam transmitted through or reflected from said subject article, and a controller, in which said sensing units are arranged in a dispersed configuration, that is decomposable into a partition of groups of beam trajectories, each of said groups including at least one beam trajectory, the distances between said beam trajectories in groups including more than one beam trajectory being not less than a predetermined value which is greater than at least one of the distances between said beam trajectories in said plurality of beam trajectories, specifically said sensing units comprise a first group and a second group, and said controller sends a first activation signal to said first group to activate at a first time and a second activation signal to said second group to activate at a separate second time, and each beam trajectory of said first group of sensing units is spaced from each other beam trajectory of said first group of sensing units a greater distance than it is spaced from the nearest beam trajectory of said second group of sensing units. According to the invention, the distances between the beam trajectories within the same group are in particular greater than the smallest distance between the plurality of beam trajectories, preferably greater than the second smallest distance. Said beams of electromagnetic radiation remain essentially concentrated around their respective trajectories upon free propagation.

Thus, in a simplest form the present invention is a sensing apparatus in which sensing units of a first group and a second group of sensing units are interspersed, and are then utilized at separate times to one another. This allows for sensing units of the first group to be activated at a time when there is no interference from the second group, and vice versa.

It will be appreciated that the sensing units can be arranged in various two or three dimensional configurations, as appropriate to any specific application. For example, the energy source can be a single energy source which could transmit beams of electromagnetic radiation in different directions, for example through lenses or a prism, to detectors arranged in a two or three dimensionally dispersed configuration around the single energy source. Also, the sensing apparatus could be configured in a reflection arrangement in which the detectors are arranged to detect the beams of electromagnetic radiation reflected by a subject article (or by a reflective element disposed behind it), the detectors being provided on the same side of the subject article as the energy source.

However, in a preferred construction the sensing units can each comprise a separate energy source with a direction of beam transmission along a respective beam trajectory, and the sensing units can be arranged in a dispersed configuration with the directions of beam transmission parallel to one another, at least in a spatial region that is provided for the passage of the subject article during its movement across the plurality of beam trajectories. Therefore, the sensing apparatus can be arranged to sense the internal structure of a subject three dimensional article disposed in the path of the parallel beams of electromagnetic radiation, with each sensing unit sensing the nature of the material located between its energy source and detector. Collectively the sensing units sense the nature of an area of material located between all parallel energy sources and detectors.

The sensing units can be arranged in any dispersed configuration in which each beam trajectory of the first group of sensing units is spaced from each other beam trajectory of the first group of sensing units a greater distance than it is spaced from the nearest beam trajectory of the second group of sensing units. In known sensor apparatus of this kind the sensing units are arranged in a line. If this configuration was used then the sensing units of the first group of sensing units would simply alternate with the sensing units of the second group of sensing units in order to achieve the invention. Other linear arrangements are possible, such as a cross or the outline shape of a square, circle or other shape in which detectors of the first group of sensing units and the second group of sensing units can alternate with one another along the line or outline. The invention could also include any more complex shape or configuration, or a random dispersal in which is the spacings between the sensing units vary, but in which each sensing unit of the first group of sensing units is still spaced from each other sensing unit of the first group of sensing units a greater distance than it is spaced from the nearest sensing unit of the second group of sensing units.

As explained above, NIR source beams scatter as they pass through material and in some instances this scatter might be minimal enough for the invention to be workable with just a first group and a second group of sensing units. However, the present invention finds particular application in the sensing of the internal structure of meat being processed for human consumption, and in that application a greater number of groups of sensing units may be required, because the scale of the subject articles is too small for just two groups of sensing units to be effective.

Therefore, the sensing units can further comprise a third group and a fourth group, in which each detector of each of the first, second, third and fourth groups of sensing units can be spaced from each other unit of its own group of sensing units a greater distance than it is spaced from the nearest unit of each of the other groups of sensing units. The controller can send a third activation signal to the third group of sensing units and a fourth activation signal to the fourth group of sensing units; the first, second, third and fourth activation signals being configured to activate the first, second, third and fourth groups of sensing units at separate times to one another. More generally, the number of groups and associated activation signals is not limited to four or less. There may be more than four, specifically any even number greater than four up to a theoretical limit imposed by the total number of beam trajectories of said plurality of beam trajectories.

Therefore, in this form the present invention is a sensing apparatus in which units of a first, second, third and fourth group of sensing units are interspersed, and are then utilized at separate times to one another in a quad activation sequence. This allows for sensing units of each group to be activated at a time when there is no interference from any of the other groups. This allows for a more condensed array of sensing units, and in particular one condensed enough to generate enough detector signals to allow a workable visual image to be created.

The sensing units of the first, second, third and fourth groups can be arranged in any dispersed configuration in which each unit of the first, second, third and fourth groups of sensing units is spaced from each other unit of its own group a greater distance than it is spaced from the nearest unit of each of the other groups of sensing units. As explained above, in known sensor apparatus of this kind the sensing units are arranged in a line, and if so the units of the first, second, third and fourth groups of sensing units could be configured in that repeating order in order to achieve the invention.

However, NIR lasers transmitted into chicken meat scatter over an area of about 40 mm. This means that if the sensor units of the first, second, third and fourth groups were arranged in a line, the sensor units would have to be spaced apart in that line by at least 10 mm in order to be sure to avoid interference between sensor units of the same group. This would make the spatial resolution of the sensing apparatus too low for this application. One way to overcome this issue would be to have a greater number of groups of sensing units, thereby increasing the distance between the sensing units of each group, but this means it would take longer for all the sensing units to activate, which itself creates issues.

In addition to the above, the closer the senor units are to one another the better the quality of data which can be gathered on the internal structure of the subject article, and in particular the better visual image which can be generated. One way to achieve closer sensing is to take advantage of the fact that the subject article is travelling past the sensing apparatus at a constant speed, and can therefore be sensed at different moments as it travels past.

Therefore, the sensing units can be arranged in an array comprising rows and columns, and in a direction from a top row to a bottom row of the array each row can be laterally offset from the preceding row by a distance equal to a distance between the sensing units in each row divided by the number of rows. With this configuration the conventional single line of sensing units has been re-arranged into a two dimensional array which is dispersed in the direction of travel of the subject article. In a specific embodiment the rows extend transverse to the direction of travel. The number of rows may be two or more, in particular three or more. The number of sensing units in each row may be two or more, in particular three or more.

Due to the lateral offset between each row, each column comprises a set of sensing units arranged at a pitch angle, so each one is only a short lateral distance apart from the next. Therefore, provided the subject article travels past the sensing apparatus at a speed which is a factor of the distance between the rows, data gathered from each sensing unit in each column can be gathered back into a single line representing one plane of the subject article, in which the spaces between the sensing units are small.

In a specific embodiment a first set of alternating columns of the array can each comprise alternating sensing units of the first and second groups, and a second set of alternating columns of the array can each comprise alternating sensing units of the third and fourth groups. What this creates is an array made up of square configurations of four sensing units, which in a clockwise direction comprise sensing units of the first, third, fourth and second groups. In this configuration nearest neighbors of a sensing unit 2 of a group belong to the other groups, while the nearest sensing unit of its own group is always two spacings away along each row or column.

It will be appreciated that the array can comprise any number of sensing units. In a specific embodiment the total number is divisible by four. However, preferably the array can comprise sixty four sensing units arranged in eight rows and eight columns.

With this configuration it is possible to have sixty four sensing units in an array which is only 16 cm wide. To achieve this the sensing units in each row can be spaced apart by a distance of substantially 20 mm and the rows can also be spaced apart by a distance of substantially 20 mm. The lateral offset between rows (the pitch of the columns) can then be 2.5 mm. Therefore, a plane of the subject article is initially subjected to 20 mm spaced sensing by the top row of the array, and it then travels to the next row where it is subjected to similarly 20 mm spaced sensing by the next row, but 2.5 mm across. This continues down all eight rows until a complete line of sensing with 2.5 mm spacing is achieved. This is close enough together for sufficient data to be gathered to enable a decipherable image to be formed.

As referred to below, the quad activation sequence of the first, second, third and fourth groups of sensing units can occur in 1 ms. If so, the speed at which the subject article travels past the sensing apparatus can be set so a plane of the subject article which is perpendicular to the travelling direction would travel the 20 mm from the first row to the second row in 1 ms. However, this is a high speed, so instead the speed can be set so a plane of the subject article would travel the 20 mm from the first row to the second row in more than 1 ms, for example in 4 ms, which is 5 meters per second, or in 8 ms, which is 2.5 ms meters per second. Any speed which is an integer multiple of the distance between the rows can be chosen, and all that is required is that data gathered from each sensing unit in each column be gathered back into a single line representing one plane of the subject article, taking that speed into account. For example, if the speed is 2.5 meters per second, then the eighth detection of the second row, the sixteenth detection of the third row, the twenty fourth detection of the fourth row and so on, all need to be aligned with the first detection of the first row to form a single plane of the subject article.

However, there is a further complicating factor, and that is that the sensing units are activated in a quad sequence, thereby causing a spatial offset as a consequence of the phase time delay present between the quad-fire phases. This spatial offset is however small. Once this small offset is combined with pixel averaging over a number of times as data is created for example every 1 ms, then the small offset is a negligible error.

The sensing units in each row can be spaced apart any other suitable distance to that described above, and the rows can also be spaced apart any other suitable distance, depending on the size of the sensing apparatus as a whole, and the size of the subject articles to be sensed, which might be very different to chicken meat. Likewise, each row can be laterally offset from the preceding row by any corresponding distance, as required.

The wavelength of the energy sources can be anything on the electromagnetic spectrum which is capable of interacting with the subject article such that a detectable remaining portion passes through it. The energy sources themselves can be anything capable of emitting such electromagnetic radiation, including LEDs or other forms of emitters. However, preferably the energy sources can comprise near infrared lasers for transmitting a laser beam through said subject article. Near infrared is electromagnetic radiation having a wavelength in the range 700 to 2000 nm. At this range of wavelength most materials are relatively transparent to electromagnetic radiation, which means a sufficient amount passes therethrough to enable inspection of an internal structure to be made.

The energy sources can be activated in various ways. For example, they can be switched on and off, or there can be a constantly energized source of energy which is activated by means of a shutter which opens and closes. Furthermore, the energy sources can be activated by a drive signal which ramps their intensity up and down, and/or adjusts their frequency.

However, preferably the controller can send a pulse wave signal to each sensing unit which switches the near infrared lasers sequentially on and off. The pulse wave signal can have a pulse duration of substantially 1 ms and peak amplitude duration of substantially 0.25 ms.

Following on from this the controller can simultaneously send first, second, third and fourth pulse wave signals to sensing units of the first, second, third and fourth groups respectively, with a phase difference of 0.25 ms between each pulse wave signal and the next. Therefore, the sensing units of the first, second, third and fourth groups are activated in a continuous 1 ms quad firing sequence.

As referred to above, the present invention is intended to provide a means to detect the internal structure of meat being processed for human consumption, and in particular to detect the presence of bone or cartilage particles in chicken. The data gathered by the sensing apparatus can be utilized in any appropriate or expedient manner. For example, the data can simply be processed by a suitable computer program which can determine from the raw data gathered by the detectors whether bone or cartilage particles are present in a particular subject article. This can be done by comparing detection signals sent by the detectors with reference signals which correspond with the activation signal sent to the energy source. From this a difference can be readily determined, and a determination made. If so, a suitable automatic action can be performed, such as an alarm, or the activation of a mechanism to remove that subject article from the production line.

However, preferably the sensing apparatus can further comprise an imaging device comprising an imaging function and a visual display screen. Each detector can transmit a detection signal to the imaging device corresponding to the electromagnetic radiation detected in use. The visual display screen can comprise a plurality of pixels, and the imaging function can establish a visual characteristic of each of the pixels according to a detection signal received from a sensing unit. The visual characteristic of each pixel can simply be a grade from white to black. Therefore, in basic terms the greater the amount of electromagnetic radiation detected by the detector the lighter the corresponding pixel is made to be by the imaging function. As such, if there are any bone or cartilage particles present in the subject article, these will be visible on the visual display screen as dark objects. This kind of imaging technique is known, and there are many kinds of enhancements and adjustable parameters, such as filters and phase adjustments in order to manipulate the detection signals such that a workable image can be created. As such features are known they are not described herein in further detail.

Each detector can transmit a continuous live detection signal to the imaging device, such that the visual display screen presents a live animated image. This occurs as a result of the speed of the continuous quad firing sequence.

Due to the above described phasing issues inherent in the quad activation sequence and the shape of the array, the data which is gathered by the first, second, third and fourth groups of sensing units and sent to imaging device will relate to different areas of the subject article as it travels past the array of sensing units. Therefore, the imaging device can comprise a phase compensation function to bring detection signals transmitted from detectors of the first, second, third and fourth groups of sensing units into phase with one another so a decipherable image is created.

In a preferred construction the sensing apparatus can comprise an upper housing in which the energy sources can be disposed, a lower housing in which the detectors can be disposed, and a conveyor belt apparatus for moving subject articles between the upper housing and the lower housing. This is a generally known configuration in the sensing industry, and is applicable to the present invention because it provides a means by which a continuous stream of subject articles can be moved past the sensing apparatus at a constant speed.

BRIEF DESCRIPTION OF THE DRAWING

The present invention can be performed in various ways, but one embodiment will now be described by way of example and with reference to the accompanying drawings, in which.

DETAILED DESCRIPTION OF THE INVENTION

As shown in the Figures, a sensing apparatus 1 comprises a plurality of sensing units 2 comprising an energy source, in the form of NIR lasers 3, for transmitting a beam of electromagnetic radiation along a beam trajectory onto a subject article (not shown) and a detector 4 for receiving the beam emerging from the subject article, and a controller, in the form of computer processor 5. As explained further below, the sensing units 2 are arranged in a dispersed configuration; the sensing units 2 comprise a first group 6 and a second group 7, and the controller (5) sends a first activation signal 8 to the first group 6 to activate at a first time and a second activation signal 9 to the second group 7 to activate at a separate second time. In the dispersed configuration each beam trajectory of the first group 6 of sensing units 2 is spaced from each other beam trajectory of the first group 6 of sensing units 2 a greater distance than it is spaced from the nearest beam trajectory of the second group 7 of sensing units 2.

Figure 1:
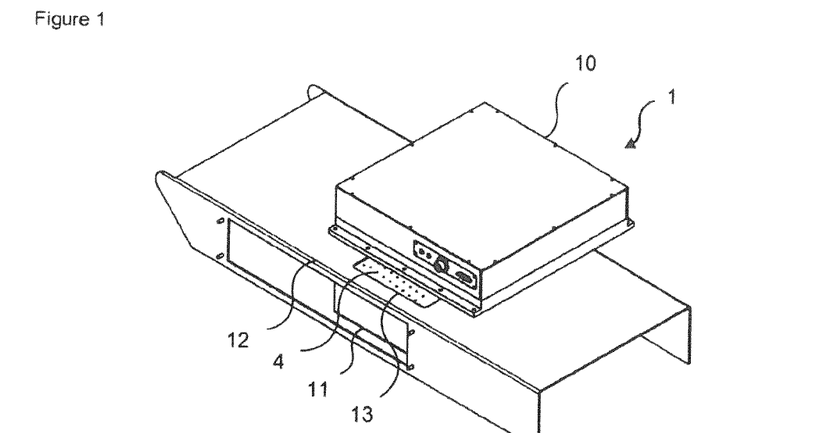
FIG. 1 is a perspective view of sensing apparatus according to the present invention.

Referring to FIG. 1, the sensing apparatus 1 comprises an upper housing 10 in which the NIR lasers 3 and the computer processor 5 are disposed, and a lower housing 11 in which the detectors 4 are disposed. The upper housing 10 and lower housing 11 are designed to be mounted onto existing framework (not shown) forming part of a production line for meat for human consumption. When mounted in this way, the NIR lasers 3 of each sensing unit 2 are vertically aligned with a corresponding detector 4 underneath it, so the directions of the beam trajectories are all parallel to one another. The lower housing 11 is mounted under a conveyor platform 12, which is designed to be integrated into a conveyor belt mechanism (not shown) forming a part of a production line for meat for human consumption. An aperture 13 is provided in the conveyor platform 12, exposing the detectors 4. Therefore, subject articles, in the form of processed chicken meat, can be passed between the upper housing 10 and the lower housing 11 at a constant speed.

Figure 2:
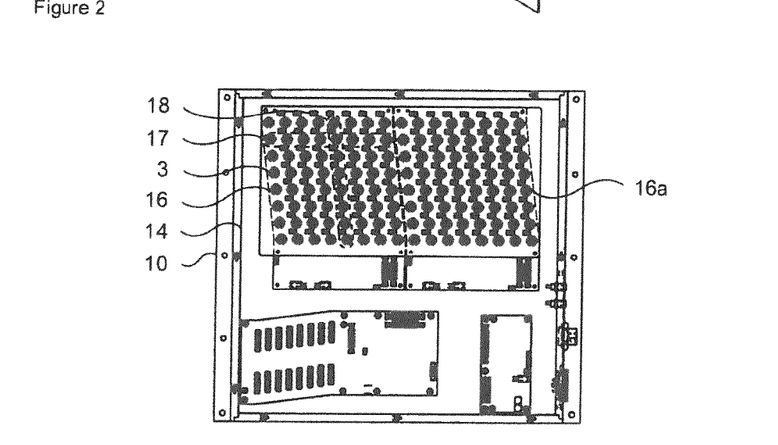
FIG. 2 is an underside view of an upper housing of sensing apparatus as shown in FIG. 1.
Figure 3:
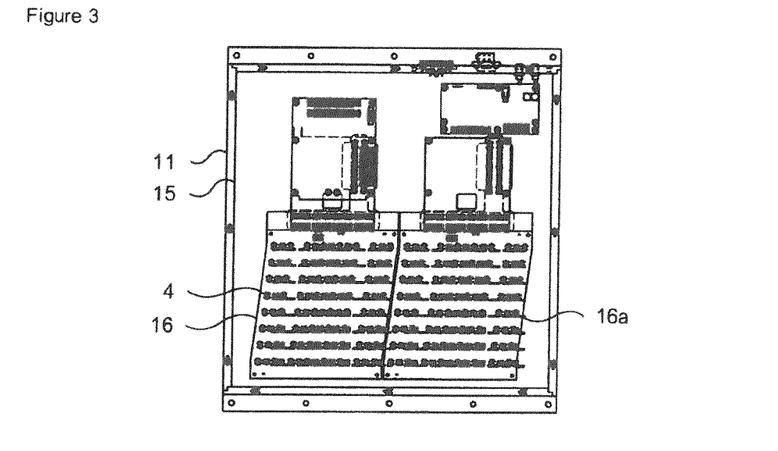
FIG. 3 is a top view of a lower housing of sensing apparatus as shown in FIG. 1.

FIGS. 2 and 3 show the underside 14 and topside 15 of the upper housing 10 and lower housing 11 respectively. This illustrates that the sensing units 2, made up of the opposing NIR lasers 3 and detectors 4, are arranged into an array 16. In fact, in sensing apparatus 1 there are two such arrays 16 and 16a, each of which comprises sixty four sensing units 2 arranged into eight rows 17 and eight columns 18.

Referring now to FIGS. 4 to 7, these illustrate the arrangement of the sensing units 2 in the array 16, which is made up of sixty four sensing units 2 arranged in eight rows 17 and eight columns 18. In particular, in sensing apparatus 1 there are not only the first group 6 and the second group 7 of sensing units, but also a third group 19 and a fourth group 20. The computer processor 5 sends a third activation signal 21 to the third group 19 and a fourth activation signal 22 to the fourth group 20. While the invention can be carried out with only two such groups, in the preferred embodiment four are used. FIGS. 4 to 7 show the NIR lasers 3 of the first, second, third and fourth groups 6, 7, 19 and 20 firing respectively, which illustrates their location.

It will be appreciated that a first set of alternating columns 23 of the array 16 each comprise alternating sensing units 2 of the first group 6 and the second group 7, and a second set of alternating columns 24 of the array 16 each comprise alternating sensing units of the third group 19 and the fourth group 20. What this creates is an array 16 made up of sixteen square configurations 25 of four sensing units 2, which in a clockwise direction comprise sensing units 2 of the first group 6, the third group 19, the fourth group 20 and the second group 7. In this configuration nearest neighbours of a sensing unit 2 of a group belong to other groups, while the nearest sensing unit 2 of its own group is always two spacings away along each row 17 or column 18.

Figure 4:
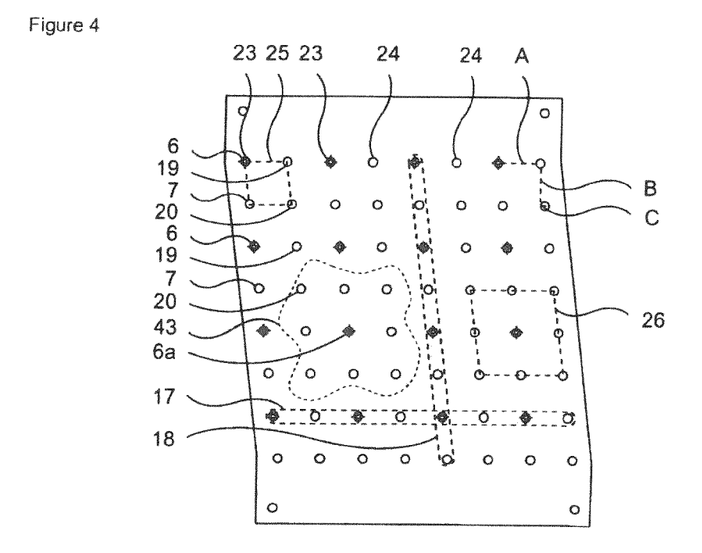
FIG. 4 is a diagrammatic view of energy sources of an array of sensor units of the sensing apparatus as shown in FIG. 1 in a first mode of operation.
Figure 5:
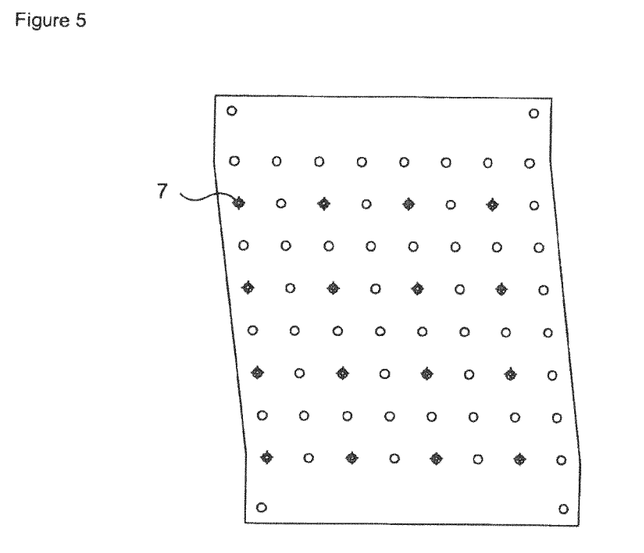
FIG. 5 is a diagrammatic view of the energy sources shown in FIG. 4 in a second mode of operation.
Figure 6:
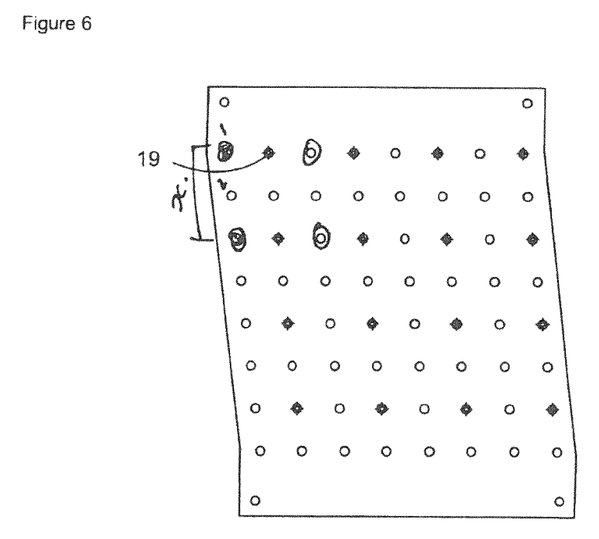
FIG. 6 is a diagrammatic view of the energy sources shown in FIG. 4 in a third mode of operation.
Figure 7:
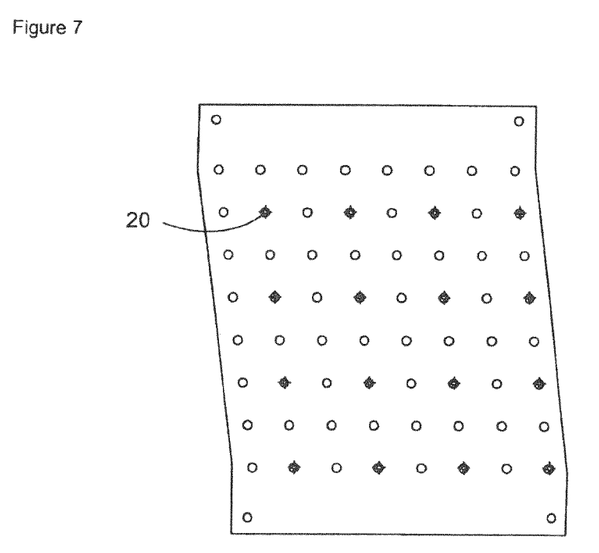
FIG. 7 is a diagrammatic view of the energy sources shown in FIG. 4 in a fourth mode of operation.

The array 16 is 16 cm wide. The sensing units 2 in each row 17 are spaced apart by a distance A of 20 mm and the rows 17 are spaced apart by a distance B of 20 mm. The lateral offset C between the rows 17 is 2.5 mm.

Figure 8:
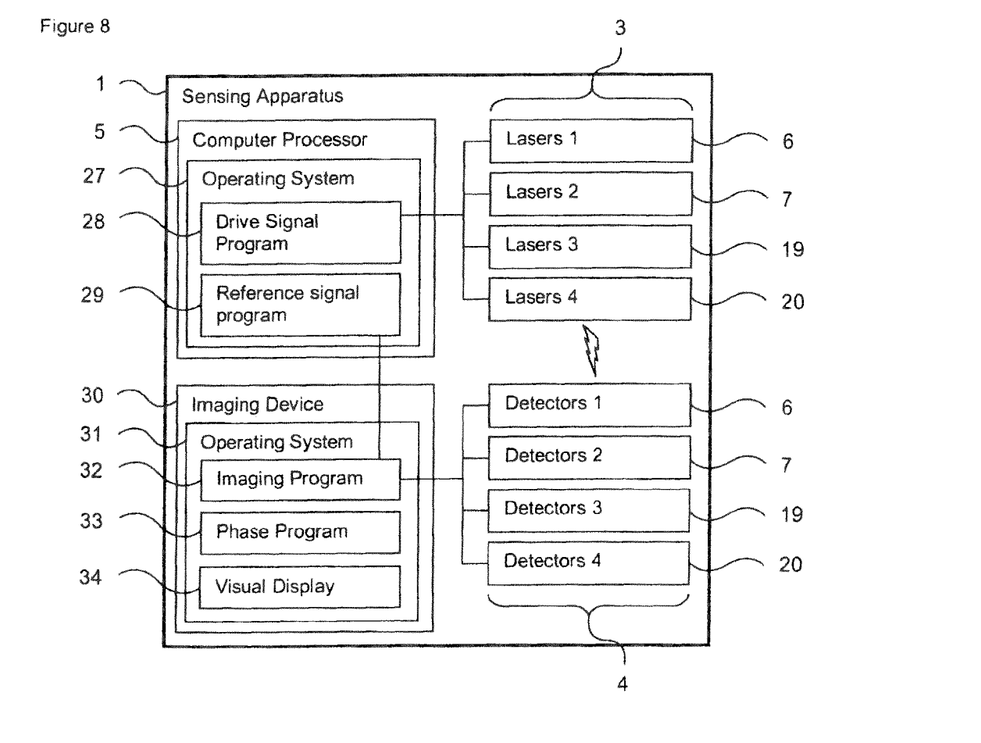
FIG. 8 is a diagrammatic view of the operational components of the sensing apparatus as shown in FIG. 1.

Referring to FIG. 8, the computer processor 5 comprises an operating system 27, which comprises a drive signal sub-program 28. This generates and sends the first, second, third and fourth activation signals 8, 9, 21 and 22, to the first, second, third and fourth groups 6, 7, 19 and 20 of sensing units 2 respectively.

Figure 9:
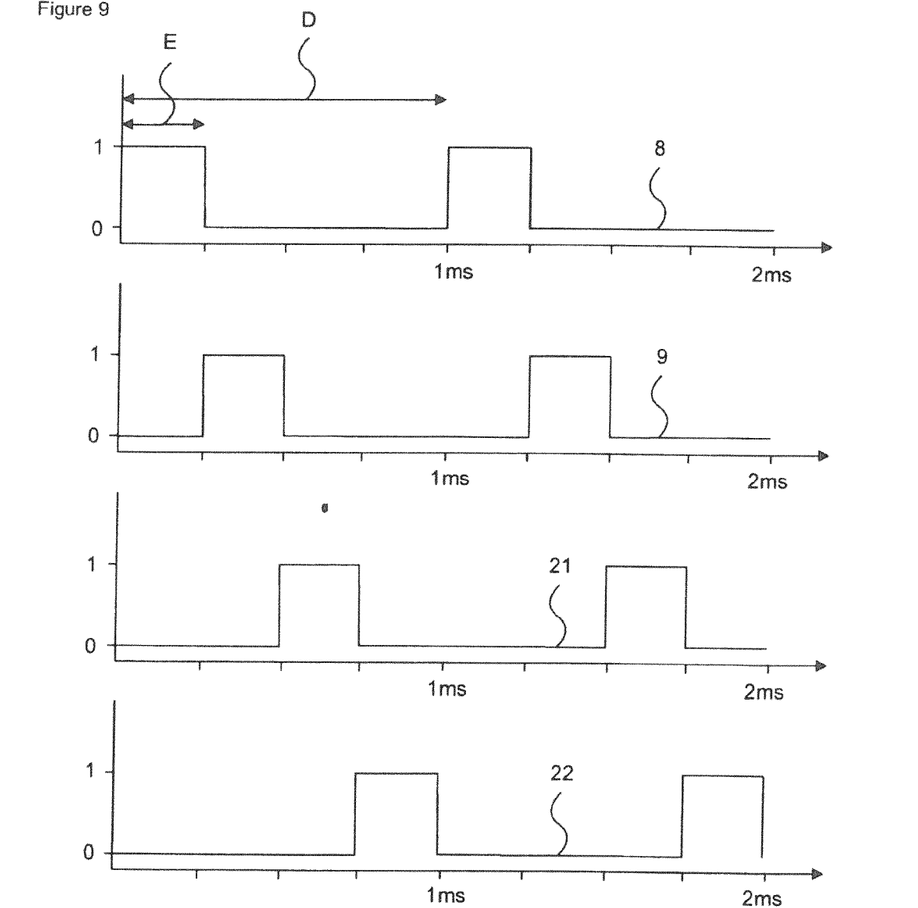
FIG. 9 is a diagrammatic view of first, second, third and fourth pulse wave signals sent to first, second, third and fourth groups of sensing units of the sensing apparatus as shown in FIG. 1.

These activation signals 8, 9, 21 and 22 are illustrated diagrammatically in FIG. 9, which shows that they are pulse wave signals with a period D of 1 ms and peak amplitude duration E of 0.25 ms. These four signals 8, 9, 21 and 22 are sent simultaneously to the first, second, third and fourth groups 6, 7, 19 and 20 of sensing units 2 respectively, with a phase difference of 0.25 ms between each pulse wave signal and the next. Therefore, the sensing units of the first, second, third and fourth groups 6, 7, 19 and 20 are activated at separate times to one another in a continuous 1 ms quad firing sequence.

The operating system 27 also comprises a reference signal sub-program 29, which generates and sends reference signals which correspond with the activation signals 8, 9, 21, and 22, and which are used for comparison with detection signals.

The sensing apparatus 1 further comprises an imaging device 30 which comprises an operating system 31, which comprises an imaging sub program 32, a phase compensation sub program 33 and a visual display screen 34. The detectors 2 transmit detection signals to the imaging device 30 which correspond to the electromagnetic radiation they detect in use. The visual display screen 34 comprises a plurality of pixels, and the imaging sub program 32 establishes a visual characteristic of each of the pixels according to the detection signal received from a sensing unit 2. This is done in the known way by comparing the detection signals with the reference signals provided by the reference signal sub-program 29, in order to determine the difference. The visual characteristic of each pixel can simply be a grade from white to black. If there is no difference between a detection signal and the reference signal, then the corresponding pixel is made to be white. If the detection signal is zero, then the corresponding pixel is made to be black, and where the detection signal has a value between these two extremes, the pixel is made to be an appropriate shade of grey. Therefore, the greater the amount of electromagnetic radiation detected by the detector 4 the lighter the corresponding pixel is made to be by the imaging sub program 32. As such, if there are any bone or cartilage particles present in the subject article, these will be visible on the visual display screen 34 as dark objects. This kind of imaging technique is known, and there are many kinds of enhancements and adjustable parameters, such as filters and phase adjustments in order to manipulate the detection signals such that a workable image can be created. As such features are known they are not described herein in further detail.

(It will be appreciated that the diagrammatic view shown in FIG. 8 is very simplistic, and it is provided to merely illustrate the basic functionality of the sensing apparatus 1. In practice any known computer programming method or structure can be used to put the functions of the invention into practice, and it will be down to the individual programmer and the software and/or hardware used. For example, the imaging device 30 may be integrated with the computer processor 5, and not be separate from it. There can also be many other sub programs and functions which are known in computer science and which can be applied to the sensing apparatus 1 to improve its performance in any of the known ways. All that is required is that the functions of the invention be provided for and that the sensing apparatus 1 performs the novel features as described herein.)

The detectors 4 transmit a continuous live detection signal to the imaging device 30, such that the visual display screen 33 presents a live animated image. This occurs as a result of the continuous quad firing sequence.

Figure 10:
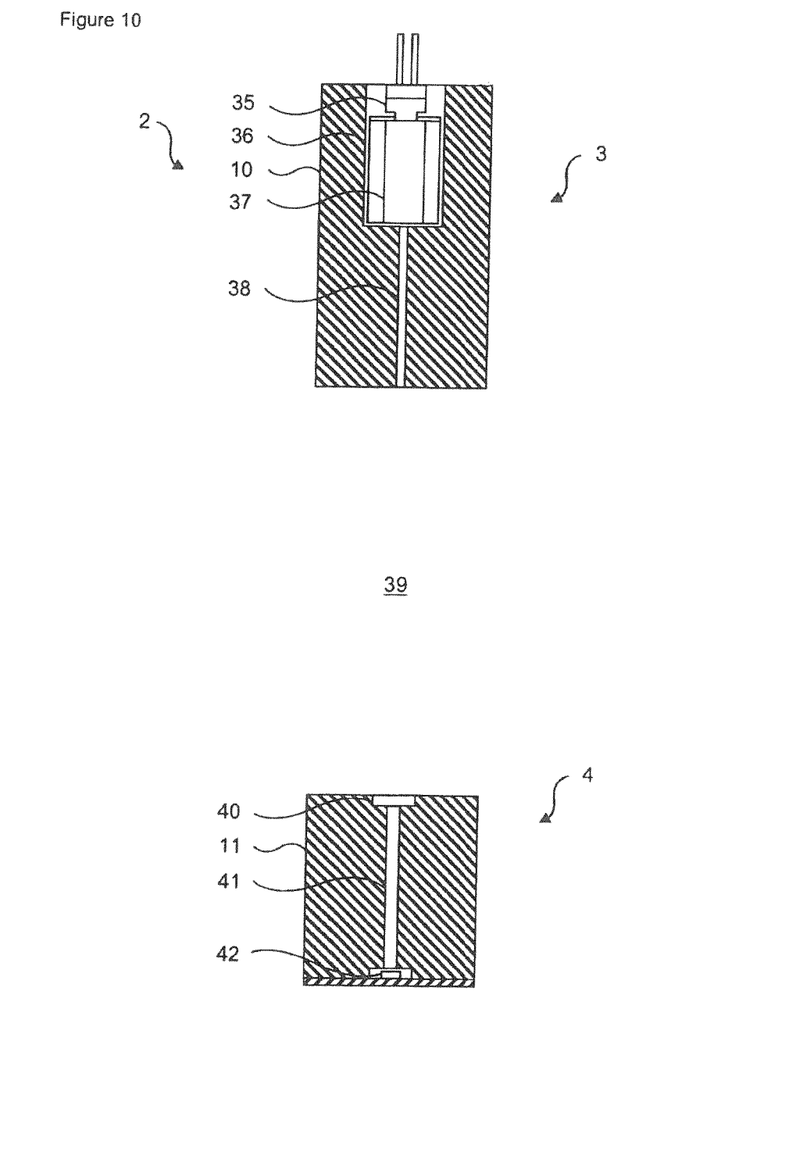
FIG. 10 is a diagrammatic side view of a sensing unit of the sensing apparatus as shown in FIG. 1.

FIG. 10 illustrates one sensing unit 2 of the array 16. This is a known construction and comprises the opposed NIR laser 3 and detector 4. The NIR laser 3 comprises an energy emitting diode 35, which is located in a slot 36 formed in the upper housing 10. A lens assembly 37 is located over the diode 35, so when it is activated, a NIR laser beam is transmitted through an upper channel 38, and through the gap 39 to the lower housing 11. The NIR laser beam has a wavelength which is appropriate for the application. In this case, the NIR laser beam has a wavelength which substantially passes through chicken meat, but which at least partially does not pass through bone or cartilage particles in the chicken meat, so their presence can be detected. When the NIR laser beam reaches the detector 4, it passes through a lens 40 and then through a lower channel 41 to a detector diode 42. The detector diode 42 is a known type of detector which can detect NIR laser beams, and which can transmit a detection signal.

Referring back to FIG. 4, the NIR laser beam can scatter over an area 43 of 40 mm or more in diameter when passing through a subject article such as a piece of chicken meat. Therefore, the scattering caused by the activation of sensing unit 6a would cause interference with all the eight sensing units around it, as shown, were they to be activated at the same time.

In use the sensing apparatus 1 of the invention operates as follows. The sensing apparatus 1 is mounted to the framework (not shown) of a meat for human consumption production line, with a conveyor belt arranged to travel between the upper housing 10 and the lower housing 11 at a constant speed of 2.42 meters per second. Items of chicken for human consumption are placed on the conveyor belt so they pass between the upper housing 10 and the lower housing 11 at this constant speed.

The computer processor 5 is operated such that the drive signal sub program 28 sends the first, second, third and fourth activation signals 8, 9, 21 and 22 to the first, second, third and fourth groups 6, 7, 19 and 20 of sensing units 2 simultaneously, in the phase sequence illustrated in FIG. 9. As a result, the NIR lasers 3 of the first, second, third and fourth groups 6, 7, 19 and 20 of sensing units 2 are activated in a 1 ms quad firing sequence as illustrated by FIGS. 4 to 7. The computer processor 5 is also operated such that the reference signals are sent to the imaging sub program 32 of the imaging device 30.

The detectors 4 of the first, second, third and fourth groups 6, 7, 19 and 20 of sensing units 2 detect the NIR laser beams which reach them, and send detection signals to the imaging device 30. The imaging sub program 32 then compares the detection signals with the reference signals provided by the reference signal sub-program 29, in order to determine the difference. It then establishes a visual characteristic of each of the pixels of the visual display screen 34 to create an image. The visual characteristic of each pixel is a grade from white to black. If there is no difference between a detection signal and the reference signal, then the corresponding pixel is made to be white. If the detection signal is zero, then the corresponding pixel is made to be black, and where the detection signal has a value between these two extremes, the pixel is made to be an appropriate shade of grey.

At the same time, the phase compensation sub program 33 is operated in order to compose the received detection signals into a decipherable image. This is referred to sometimes as a re-stitching function. The quad activation sequence of the first, second, third and fourth groups 6, 7, 19 and 20 of sensing units 2 occurs in 1 ms, and the conveyor belt is moving at 2.42 meters per second. As such, a fully detected plane of a piece of chicken meat traveling on the conveyor belt is made up of detection data from all sixty four sensing units 2, but from four different moments in time that they are activated. In particular, the four sensing units 2 of the first group 6 on the first of the rows 17 (which are in the first set of alternating columns 23) are the first to detect the internal structure of a particular plane of the piece of chicken meat. At the same time, the three groups of four sensing units 2 of the first group 6 on the third, fifth and seventh of the rows 17 are also activated, and they detect the internal structure of three other planes which are 20 mm apart from one another, and which may or may not intersect the piece of chicken meat. 0.25 ms later the four groups of four sensing units 2 of the second group 7 on the second, fourth, sixth and eighth of the rows 17 are activated, and they detect the internal structure of four other planes which are 20 mm apart from one another, which again may or may not intersect the piece of chicken meat. 0.25 ms later all the sensing units 2 of the third group 19 are activated, and 0.25 ms later all the sensing units 2 of the fourth group 20 are activated, thereby detecting the internal structure of eight further planes. This 1 ms quad firing process is repeated continuously, so data is gathered for 2.5 mm spaced areas of each successive plane of the piece of chicken meat as it travels past the sensing apparatus 1. This issue is re-stitching all the data back together so a decipherable image can be generated.

In this example, 8.25 ms after the four sensing units 2 of the first group 6 on the first of the rows 17 detected the internal structure of the plane of the piece of chicken meat, that plane is aligned with the four sensing units 2 of the second group 7 on the second of the rows 17, because it's speed of 2.42 meters per second means it has travelled the 20 mm distance. Therefore, by the time that plane of the piece of chicken meat reaches that point, it will be the ninth time the four sensing units 2 of the second group 7 on the second of the rows 17 are activated after the plane of the piece of chicken meat was under the first of the rows 17. As such, these particular detections need to be stitched together to form the detection of this plane of the piece of chicken meat.

The third group 19 and fourth group 20 of sensing units 2, which are in the second set of alternating columns 24, perform the same process, but 0.5 ms out of phase with the first group 6 and the second group 7, because they are activated in the third and fourth quarters of the 1 ms quad firing sequence. The phase compensation sub program 33 also takes this into account, and re-stitches all the gathered data together so each line of pixels on the visual display screen 34 relates to a particular plane which has travelled through the sensing apparatus 1. As the sensing apparatus 1 comprises two arrays 16 and 16a, the visual display screen 34 can display an image comprising 128 points of data collection in each line.

Due to the dispersal of the sensing units 2 in the array 16, when each one is activated the area of interference generated (as illustrated at 43 in FIG. 4) is insufficient to reach any of the sensing units 2 of the same group. Therefore, this interference does not affect the gathering of data. The quad firing sequence resolves the interference issue in a lateral direction, because each sensing unit 2 in each of the first, second, third and fourth groups 6, 7, 19 and 20 is always at least 40 mm from the next one in that row 17. The formation of the sensing units 2 into the eight rows 17 resolves the interference in a longitudinal direction, because again each sensing unit 2 in each of the first, second, third and fourth groups 6, 7, 19 and 20 is always at least 40 mm from the next one in its column 18. The pitching of the columns 18 by 2.5 mm from row to row, and the re-stitching of the data by the phase compensation sub program 33 then allow for the array 16 of sensing units to provide planar detection with spacings of only 2.5 mm between detection points.

The present invention can be altered without departing from the scope of claim 1 or 7. For example, in one alternative embodiment (not shown) the sensing apparatus is configured in a reflection arrangement in which the detectors are arranged to detect beams of electromagnetic radiation reflected by a subject article (or by a reflective element disposed behind it), the detectors being provided on the same side of the subject article as the energy sources.

In other alternative embodiments (not shown) the energy sources are activated in different ways, including constantly energized sources of energy which are activated by means of a shutter which opens and closes, and energy sources which are activated by a drive signal which ramps their intensity up and down, and/or adjusts their frequency.

In another alternative embodiment (not shown) the data gathered by the sensing apparatus is processed by a suitable computer program to determine from the raw data gathered by the detectors whether bone or cartilage particles are present in a particular subject article, rather than the data being used to generate a visual image.

In other alternative embodiments (not shown) sensing apparatus of the invention are configured and operated to investigate the internal structure of different subject articles, such as other foods, luggage, the human body and so on. This requires the use of different energy sources which are appropriate to the application.

Therefore, the present invention provides a sensing apparatus which can detect the internal structure of a subject article at spacings which are much smaller than the area of interference caused by the sensing. This allows for an array of NIR lasers to be used to detect the presence of bone or cartilage particles in chicken being processed for human consumption, which has previously not been possible due to the scattering of the NIR laser beams caused by the subject material.

The invention claimed is:

1. A method for inspection of a subject article, comprising the steps of:
    providing a plurality of beam trajectories for beams of electromagnetic radiation, said plurality of beam trajectories being arranged in a dispersed configuration that is decomposable into a partition of groups of beam trajectories, each of said groups including at least one beam trajectory, distances between said beam trajectories in groups including more than one beam trajectory being not less than a predetermined value which is greater than at least one of the distances between said beam trajectories in said plurality of beam trajectories; and
    successively activating each of said groups so as to cause said beams of electromagnetic radiation to be transmitted along said beam trajectories of said group while positioning said subject article in said plurality of beam trajectories, and sensing the electromagnetic radiation from each of said beams that have been transmitted through or reflected from said subject article.

2. The method according to claim 1, wherein the positioning includes moving the subject article across said plurality of beam trajectories.

3. The method according to claim 1, further including establishing a correspondence between each of said sensed electromagnetic radiation from each of said beams that have been transmitted through or reflected from said subject article and a corresponding location of said subject article where said electromagnetic radiation has been reflected from or transmitted through.

4. The method according to claim 3, including converting said correspondence between said locations and said electromagnetic radiation which has been transmitted through or reflected from said subject article into a representation by pixels on a screen.

5. The method according to claim 1, wherein all of the groups have a same number of beam trajectories.

6. The method according to claim 1, including creating at least one of said groups of beam trajectories by a translational shift of another one of said groups.

7. The method according to claim 1, including selecting said predetermined value so as to avoid interference between said beams on said beam trajectories.

8. An apparatus for inspection of a subject article, comprising:
    means for transmitting a plurality of beams of electromagnetic radiation along a plurality of beam trajectories, said beam trajectories being arranged in a dispersed configuration that is decomposable into a partition of groups of beam trajectories, each of said groups including at least one beam trajectory, distances between said beam trajectories in groups including more than one beam trajectory being not less than a predetermined value which is greater than at least one of the distances between said beam trajectories in said plurality of beam trajectories;
    means for positioning said subject article in said plurality of beam trajectories; and
    means for sensing the electromagnetic radiation of each of said beams that has been transmitted through or reflected from said subject article.

9. The apparatus according to claim 8, wherein said positioning means includes means for moving said subject article across said plurality of beam trajectories.

10. The apparatus according to claim 8, wherein said beam trajectories are parallel to one another in a spatial region that is provided for positioning said subject article in said plurality of beam trajectories.

11. The apparatus according to claim 10, wherein said beam trajectories, in said region where the beam trajectories are parallel to one another, are arranged in an array of parallel rows and columns, said rows extending transverse to a direction of motion of said subject article and being equally spaced along said direction of motion, said beam trajectories being equally spaced in said rows.

12. The apparatus according to claim 11, wherein said beam trajectories in each of said rows are laterally offset from the beam trajectories in a neighboring row by a distance equal to a distance between the beam trajectories in each row divided by a number of rows.

13. The apparatus according to claim 11, wherein in each of said groups a distance between the beam trajectories in a direction of the rows is equal to or greater than twice the spacing between the beam trajectories in each row and a distance in an orthogonal direction is equal to or greater than twice the spacing between the rows.

14. The apparatus according to claim 8, wherein said transmitting means includes a plurality of energy sources each adapted to supply a beam of electromagnetic radiation to one of said beam trajectories, and a plurality of sensors, each adapted to detect the electromagnetic radiation from one of said beams transmitted through or reflected from said subject article.

15. The apparatus according to claim 14, wherein the energy sources are near infrared lasers.

16. The apparatus according to claim 8, further comprising:
    means for successively activating each of said groups so as to cause said beams of electromagnetic radiation to be transmitted along said beam trajectories in each of said groups, with said subject article in position across said plurality of beam trajectories.

17. The method according to claim 8, wherein said predetermined value is such so as to avoid interference between said beams on said beam trajectories.

* * * * *